July 28, 1959    F. J. FONTEIN    2,896,785
METHOD FOR SEPARATING FINE MATERIAL
Filed Oct. 18, 1956    2 Sheets-Sheet 2

Inventor
Freerk J. Fontein
By Cushman, Darby & Cushman
Attorneys

United States Patent Office 2,896,785
Patented July 28, 1959

2,896,785

METHOD FOR SEPARATING FINE MATERIAL

Freerk J. Fontein, Heerlen, Netherlands, assignor to Stamicarbon N.V., Heerlen, Netherlands Application October 18, 1956, Serial No. 616,728

Claims priority, application Netherlands October 21, 1955

4 Claims. (Cl. 209—273)

This invention relates to particle separation and more particularly to a method and apparatus for separating fine material containing a few particles or none at all which are considerably coarser than the particle size of separation.

In my copending applications Serial Nos. 475,250 and 475,251, both filed on December 14, 1954, a method and apparatus of particle separation is disclosed which embodies the provision and use of a separating screen hereinafter referred to as a "sieve bend." The sieve bend constitutes a screening deck, either cylindrically curved or straight which is provided with a plurality of transversely extending screen apertures. A suspension, in the form of a mixture of solid particles or the like and a liquid, is fed at a predetermined minimum velocity tangentially to one surface of the screening deck so that the suspension will move in layer formation thereover. The transverse surfaces of the screening deck defining the screen apertures scrape-off or engage incremental layers from the moving layer and hence, particles having a dimension as great or greater than twice the thickness of the incremental layers will move on with the moving layer to the discharge end of the screening deck, while the smaller particles in the engaged incremental layers pass through the apertures. The primary advantage of this system of separation is that clogging of the screen is negligible since the particles passing through the screen apertures are of a size substantially one-half the width of the apertures or smaller.

However, in the screening of fine material on a sieve bend the screen sometimes becomes clogged where the material to be screened contains relatively few particles or none at all which are considerably bigger than the particle size at which the cut is made. This phenomenon is particularly likely to occur if the material to be screened is fibrous. In this case, the fibrous material that cannot pass through the screen apertures tends to block these apertures.

Accordingly, it is an object of the present invention to provide a process for screening, on a sieve bend, fine material containing no or few particles considerably coarser than the particle size at which the cut is made, which overcomes the disadvantages noted above.

Another object of the present invention is the provision of a method of the type described wherein the material to be screened is mixed with an auxilary material of solid particles, which is inert with respect to the material to be screened and which includes particles of a size considerably larger than the particle size at which the cut is made, so that those particles of the material to be screened which threaten to block the screen apertures are taken along therewith and hence the screen remains clean.

A further object of the present invention is the provision of a method of the type described in which the auxiliary material contained in the overflow coming from the screen can be separated, from the coarse particles of the material to be screened that have been taken along, and recycled in the screening process so as to make possible the use of a constant amount of auxiliary material, which need not be supplemented as there are no losses.

Still another object of the present invention is the provision of an apparatus for separating fine material containing relatively few particles or none at all which are considerably coarser than the particle size of separation which substantially reduces, if not entirely eliminates, the problem of clogging noted above.

A still further object of the present invention is the provision of an apparatus of the type described having means for separating a fine material into fractions according to size, which means is supplied with auxiliary material to prevent clogging and improved means for separately collecting the auxiliary material.

Still another object of the present invention is the provision of an apparatus of the type described having improved means for recycling an auxiliary material to prevent clogging of the separating screen without substantial loss of the auxiliary material.

These and other objects of the present invention will become more apparent during the course of the following detailed description and appended claims.

The invention may best be understood with reference to the accompanying drawings in which an illustrative embodiment is shown.

Figure 1:
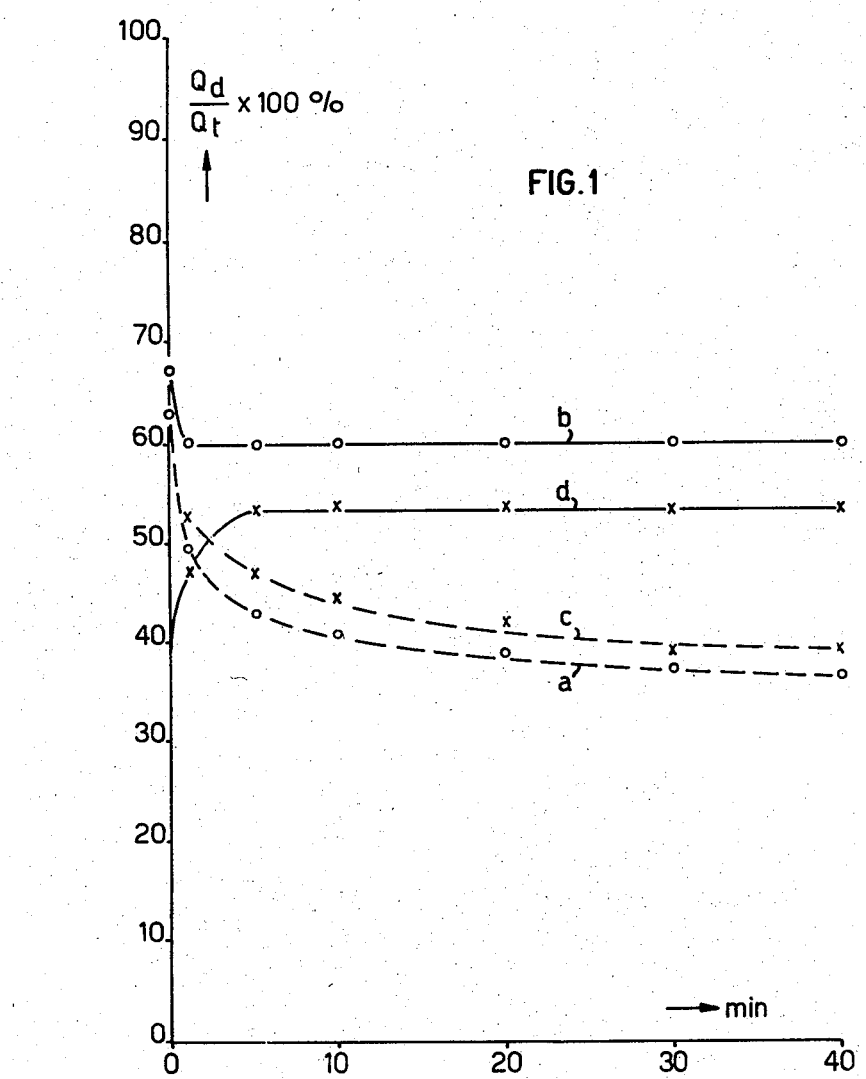
Figure 1 is a graph showing the relation between the amounts of underflow and feed as a function of time for a fibrous material, with and without addition of the auxiliary material, passed across a sieve bend.

Figure 1 represents a graph of the results of experiments in which a suspension of hemp fibres and bits of cotton wool in water, both with and without addition of rubber particles, were passed across a sieve bend having a width of slot of 0.2 mm., the graph showing the relation between the amount of the underflow and the amount of the feed, expressed in percentages, as a function of time. The underflow consisted substantially of water.

Curve $a$ shows the results of an experiment in which the suspension without an auxiliary material was supplied. It will be seen that after only one minute the percentage dropped from 63% to 49%. After 40 minutes the percentage had dropped to only 37%. The fibres had come to rest across the screen bars.

Thereafter the screen was cleaned and rubber particles witht a thickness of 1 mm. were added to the suspension (1 g./litre). The results are shown by line $b$ which indicates that the blocking of the screen is practically eliminated.

Subsequently the experiment was repeated with a suspension of fibres (line $c$). The ratio between underflow and feed was 53% after 1 minute and 39% after 40 minutes. Then the rubber particles were added without the screen having been cleaned previously and the ratio was found to rise to 54% with no subsequent fall being observed (line $d$).

Figure 2:
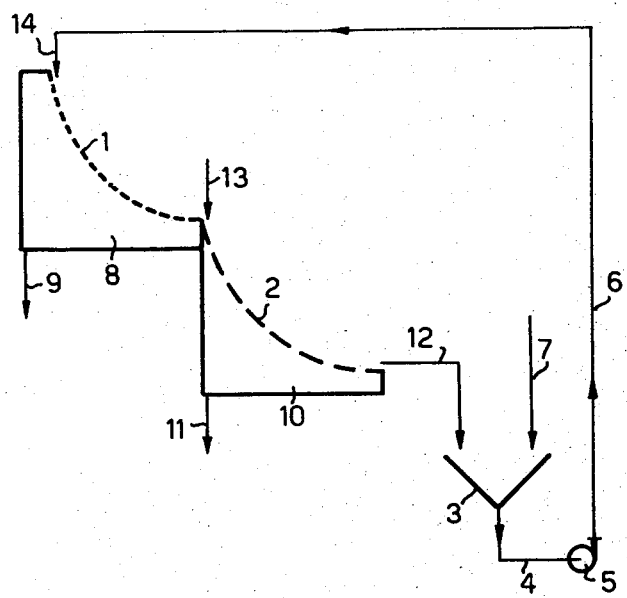
Figure 2 is a somewhat schematic view of a screening apparatus embodying the principles of the present invention.

Referring more particularly to Figure 2 of the drawings, there is shown an apparatus embodying the principles of the present invention which includes a fine-meshed sieve bend 1, a coarse-meshed screen or sieve bend 2, connected in series therewith, and a collecting funnel 3 which receives the overflow from the sieve bend 2 and also serves as a feed funnel for the material to be screened. A conduit 4 connects the outlet of the funnel 3 with a pump 5 which delivers to a conduit 6, leading to a feed device 14 for the sieve bend 1. Any suitable means may be provided for supplying the funnel 3 with fresh material to be screened as indicated at 7. The underflow from the sieve bend 1 is collected in a collecting funnel 8 and discharged through a conduit 9. The underflow from the sieve bend 2 is collected in a funnel 10 and discharged through a conduit 11. The overflow coming from sieve bend 2 may be discharged directly, but is preferably collected in the funnel 3 through a conduit 12. An additional amount of suspending liquid is tangentially fed, by means of a feed device 13, onto the screening deck of sieve bend 2 so as to entrain the overflow from sieve bend 1 and thus effect a tangentially feed or the resulting mixture onto the screening deck of the sieve bend 2. It is also within the contemplation of the present invention to provide the feed end of sieve bend 2 with overflow devices or the like for tangentially feeding the overflow from sieve bend 1 onto the screening deck of sieve bend 2. The screening deck of the sieve bend 1 has slots or apertures of such size that the material supplied at 7, which is fed onto the screening deck at 14, is separated at the desired particle size of separation. The overflow from this screen will consist for example of a material that cannot or need not be subjected to further treatment and is to be discharged.

If the material to be screened contains relatively few particles or none at all which are considerably bigger than the particle size at which the cut is made, there is a likelihood that the screen will become blocked, especially if the material is a fibrous product.

However, as noted above, by increasing the number of particles that are considerably coarser than the particle size of separation, blockage is reduced to a considerable extent or even eliminated altogether. Apparently, the particles which threatened to block the screen apertures are taken along by the particles of considerably larger size. To this end, an amount of auxiliary material, preferably comprising particles which are considerably coarser than the particle size of separation and which are inert with respect to the material to be screened, for example, small rubber spheres, are circulated through the circuit 1—2—12—3—4—5—6—14. This auxiliary material, together with the coarser particles of the material to be screened that are not capable of passing through the screen 1, constitutes the overflow of screen 1. Subsequently, the auxiliary material is separated from the coarser particles in a following treatment. This separation may be carried out in various ways, for example, in a hydrocyclone or in a settling tank, if there is sufficient difference in velocity of fall between the particles of the auxiliary material and the material which has been screened off.

In the embodiment of the present invention, illustrated in Figure 2, the overflow from the screening deck 1 is fed across the sieve bend 2, by the addition of liquid at 13, to effect this separation. The screening deck of the second sieve bend 2 has apertures through which the coarse material that has been screened off can pass but which prevents passage of the auxiliary material. Stated differently, the auxiliary material has a particle size of sufficient coarseness that all of it leaves the sieve bend 2 as overflow material and enters the funnel 3, from where it is recirculated to the starting point of the screening treatment, after having been mixed with a fresh quantity of material to be screened.

While the apparatus shown in Figure 2 illustrates the preferred arrangement of recycling an auxiliary material which is fully recovered, it will be understood that the auxiliary material may be provided by other arrangements. For example, the auxiliary material may be an intermediate product withdrawn from the manufacturing process of the material to be screened. More specifically, in a grinding circuit a portion of the intermediate product having a particle size corresponding to the size required of the auxiliary material may be passed over the sieve bends and subsequently be returned into the grinding circuit without detracting from the grinding capacity of the plant. With such an arrangement the funnel 3 receiving the intermediate product may be placed so as to feed directly to the sieve bend 1 thus eliminating the need for pump 5.

It will be understood that the sieve bends 1 and 2 as well as their feed devices 13 and 14 may be of any suitable construction. Exemplary constructions are disclosed in my copending applications referred to above. The auxiliary material preferably consists of particles which are inert with respect to the material being screened. Moreover, the particles should be of a material which will not erode the sieve bend itself or at least one which substantially prevents such action. Small rubber spheres have been found to be a preferred auxiliary material. The proper amount of auxiliary material to be used can be determined by experiment for each case.

Figure 3:
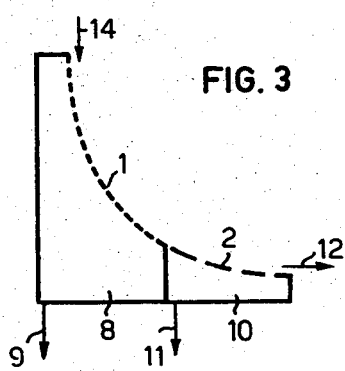
Figure 3 is a view similar to Figure 2 showing a screening apparatus of a modified form.

In the modified embodiment represented in Figure 3, the sieve bends 1 and 2 have been combined into one sieve bend, the first part of whose screening deck, 1, has small screening apertures and the second part, 2', large ones. In this case supply of liquid at 13, as illustrated in Figure 2, may generally be omitted.

It will thus be seen that the objects of this invention are fully and effectively accomplished. It will be realized, however, that various changes may be made in the specific embodiment used to illustrate this invention, without departing from the principles of the latter. Therefore, this invention includes all modifications encompassed by the spirit and scope of the following claims.

I claim:

1. A process of separating according to particle size a fine, fibrous particle containing material having no or few particles considerably coarser than the particle size of separation which comprises the steps of establishing at a receiving position a layer formation flow with a minimum initial velocity of the material and a suspending liquid together with an auxiliary material inert with respect to the fine material and having a particle size considerably coarser than the particle size of separation; supporting one surface thereof to locally define the direction of travel of said layer formation flow; interrupting the support of said one surface a fixed distance measured in the direction of flow while permitting the layer formation flow, due to its velocity, to continue substantially in the said defined direction; separating, by blocking part of the layer formation flow, a layer of a thickness smaller than half said fixed distance of support interruption from the said one surface of the layer formation flow; supporting the one surface of the remainder of the layer formation flow to locally define its direction of travel; and successively repeating the steps of interrupting the support, separating a layer by blocking, and supporting the remainder between said receiving position and a spaced discharge position along a path generally conforming to a surface generated by moving a straight line parallel to itself so that a given point on the line moves in a plane perpendicular to the moving line while maintaining a predetermined minimum velocity in said layer formation flow along the said path.

2. A process as defined in claim 1 wherein the auxiliary material is separated from the unblocked material and liquid which passes to said discharged position.

3. A process as defined in claim 1 wherein the separated auxiliary material is recycled to form a part of the layer formation flow established at said receiving position.

4. In a process of separating according to particle size a fine fibrous particle containing material containing no or few particles considerably coarser than the particle size of separation in which the fine material and a suspending liquid are fed in layer formation tangentially to a cylindrically curved sieve bend so as to separate the fine material into an undersize fraction of particles finer than the particle size of separation and an overflow fraction of particles coarser than the particle size of separation; the improvement comprising the step of mixing an auxiliary material of solid particles with the fine material and liquid fed to the sieve bend, said auxiliary material being inert with respect to the fine material and having a particle size considerably coarser than the size of separation.

References Cited in the file of this patent

UNITED STATES PATENTS

| | | |
|---|---|---|
| 968,242 | Inman | Aug. 23, 1910 |
| 1,078,917 | Gray et al. | Nov. 18, 1913 |
| 1,135,304 | Liggett et al. | Apr. 13, 1915 |
| 1,136,622 | Smith | Apr. 20, 1915 |
| 1,679,757 | Anderson et al. | Aug. 7, 1928 |
| 2,497,902 | Moyer | Feb. 21, 1950 |
| 2,799,394 | Boogaard | July 16, 1957 |

FOREIGN PATENTS

| | | |
|---|---|---|
| 515,859 | Belgium | Dec. 15, 1952 |
| 523,268 | Belgium | Oct. 31, 1953 |